March 14, 1933.  H. P. SCHLAG  1,901,778
HOE
Filed Sept. 27, 1930
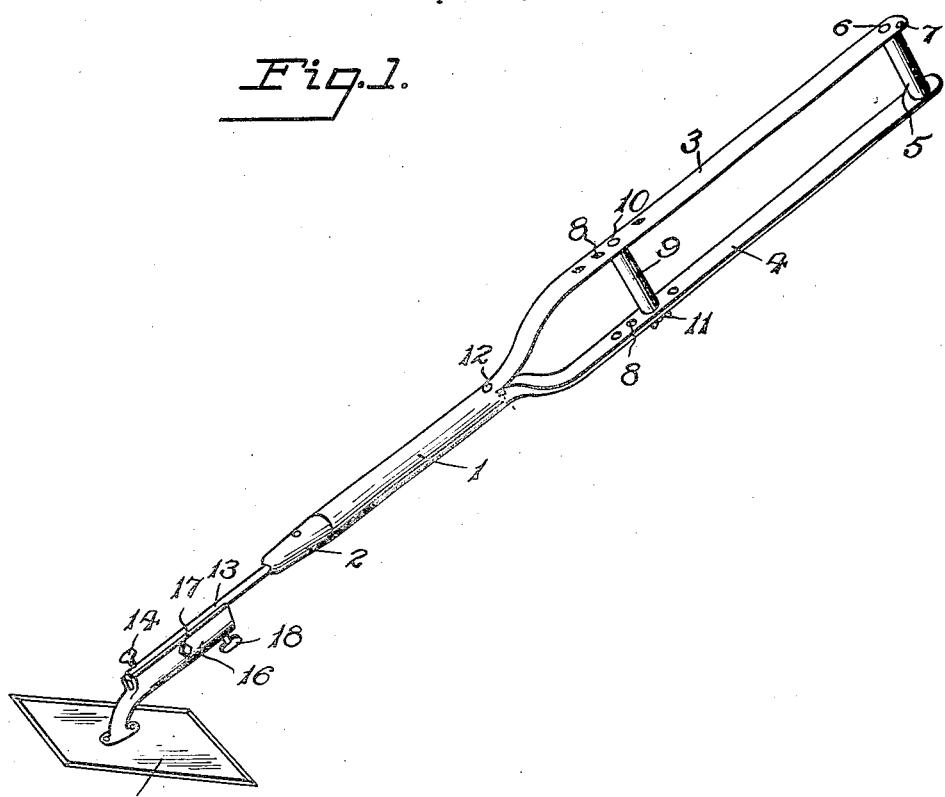
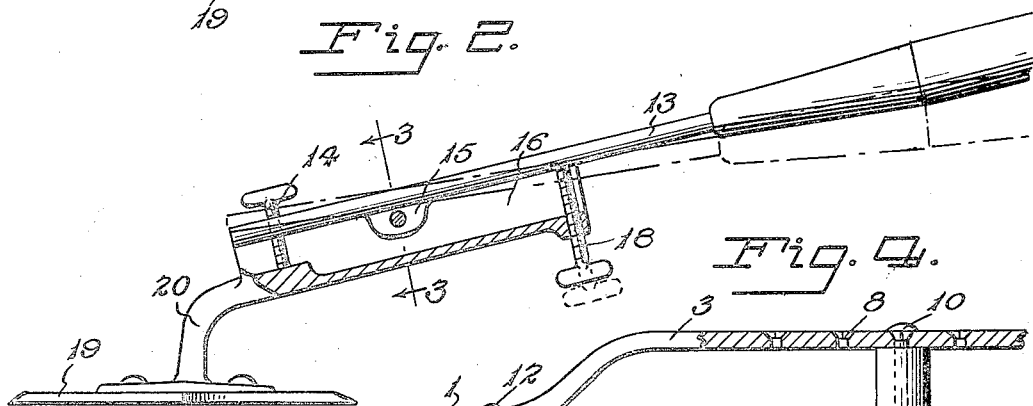
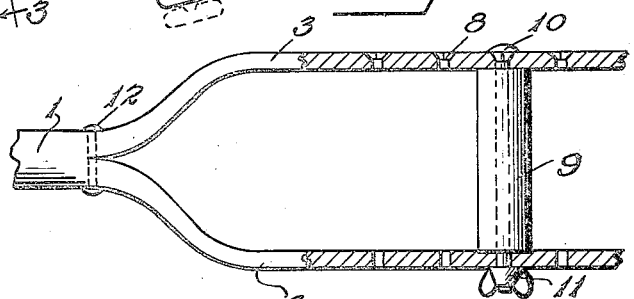
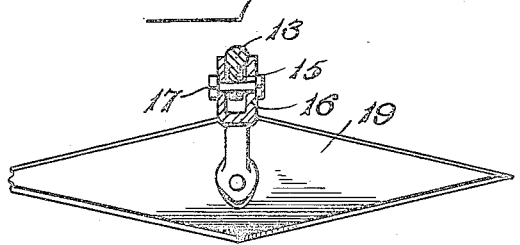
Inventor
H. P. Schlag
By Lacy & Lacy, Attorneys Patented Mar. 14, 1933

1,901,778

UNITED STATES PATENT OFFICE

HIRAM P. SCHLAG, OF FORTUNA, CALIFORNIA

HOE

Application filed September 27, 1930. Serial No. 484,867.

This invention relates to improvements in hoes and seeks, among other objects, to provide a device of this character which is adapted to be oscillated forwardly and rearwardly for a cutting operation and wherein the handle employed is disposed in such manner that cramping of the hands of the operator will be prevented.

Another object of the invention is to provide a hoe having a blade which is adjustably connected with the handle so that the angle of the blade relative to the handle may be varied to suit people of different heights and different soil conditions.

A further object of the invention is to provide a hoe wherein the handle is of such formation that the user may employ one of his arms for propelling the device in its forward and rearward oscillatory movement and the other of his arms for guiding the device.

And a still further object of the invention is to provide a device of this character wherein reinforcing means are employed for the handle so that splitting thereof will be prevented.

Other and incidental objects of the invention not mentioned in the foregoing will appear during the course of the following description.

The invention is illustrated in the accompanying drawing, wherein,

Figure 1 is a perspective view of the device,

Fig. 2 is an enlarged fragmentary vertical sectional view of the device,

Fig. 3 is an enlarged detail sectional view on the line 3—3 of Fig. 2 looking in the direction indicated by the arrows, and Fig. 4 is a fragmentary sectional view showing more particularly the adjustment feature of one of the hand grips.

Referring now more particularly to the accompanying drawing, the numeral 1 indicates a preferably wooden handle shank which is provided with a ferrule 2 and, as best seen in Fig. 1 and 4 of the drawing, the handle shank is bifurcated throughout substantially the upper half of its length to provide arms 3 and 4 which diverge and are bent to lie in substantially parallel spaced relation throughout the major portion of their length. Connecting the arms at their free ends is a preferably wooden cylindrical grip 5 which is held in position on said arms by means of a bolt 6. Extending transversely through the arms at their free ends are rivets 7 which prevent accidental splitting of said arms at their end portions. Formed in the arms 3 and 4 are series of aligned openings 8, the series of openings of the arm 3 being squared. Extending between the arms near their inner end portions is a cylindrical grip 9 and removably connecting said grip with the arms is a bolt 10 which is selectively engageable in the openings 8 for adjustably mounting said grip, a wing nut 11 being screwed on the bolt 10 for locking the grip and bolt in adjusted position. Extending through the shank 1 at the base of the bifurcated portion is a rivet 12 which provides reinforcement for said base and will prevent splitting of the shank.

Rigidly mounted in the ferrule 2 and the shank 1 is a rod 13 and screwed through the lower end portion of said rod transversely thereof is a set screw 14. Formed on the under side of said rod substantially two-thirds of the distance from the end of the handle shank is an apertured lug 15. Associated with the rod is a substantially U-shaped yoke 16 and extending transversely through the sides of said yoke medially of their ends and through the lug 15 is a bolt 17 which pivotally connects said yoke with the rod 13. As best seen in Fig. 2 of the drawing, the bight portion of the yoke is thickened at its upper end and extending through said thickened portion is a set screw 18 which normally coacts with the rod 13 and the bolt 14 for rigidly limiting the yoke against pivotal movement with respect to the rod. Connected with the yoke is a cutting blade 19 which is preferably of diamond shape. Riveted to the blade is a shank 20 having its upper end portion bent and extending into the forward end of the yoke. The shank 20, of course, connects the cutting blade 19 with the yoke and is welded or otherwise secured thereto, the inner end of the shank providing an abutment for the screw 14.

In practice, when it is desired to employ the device for cutting weeds or the like, or even for mixing mortar, the device is placed with the cutting blade on the surface to be cut or in the substance to be mixed, when the grip 9 is grasped in one hand and the grip 5 in the other. The device is then oscillated forwardly and rearwardly by pressure on the grip 5 and guided in its forward and rearward movement by lateral pressure in either direction upon the grip 9. Should it be desired to vary the cutting angle of the blade 19 with respect to the handle so that a deeper cut may be obtained, or to vary the height of the handle, the set screws 14 and 18 are retracted and advanced respectively within the yoke for rocking said yoke and thereby disposing the blade at a greater angle to the handle. As will be observed, the bolt 18 engages the rod 13, whereas the bolt 14 engages the inner end portion of the shank 20 as previously stated, for the adjusting operation. It is obvious that when it is desired to lessen the angle of the blade to the handle, the adjusting operation of the bolts 14 and 18 is reversed.

Inasmuch as the grip 9 is adjustable between the arms 3 and 4, the position of said grip may be varied to suit the length of the arms of the user and inasmuch as the grips 5 and 9 are disposed transversely of the handle to receive the hands of the user in their normal posture, cramping and consequent blistering of the hands will be largely prevented. It will further be noted that as I have employed the rivets 7 and 12 on the rods 3 and 4 and the handle shank 1 respectively, danger of splitting said arms and said handle shank is largely prevented.

It is pointed out that while I have shown a cutting blade of diamond shape, I do not limit myself to this form, as a blade of any desired shape may be employed. It may be readily understood that a substantially vertically disposed blade will be employed when the device is used for mixing mortar.

Having thus described the invention, I claim:

1. A hoe including a handle shank, a rod carried by the handle shank, a yoke adjustably connected with the rod, a blade connected with the yoke, a shank connecting the blade with the yoke, and means carried by the yoke and cooperating with the rod for adjusting said yoke with respect to said rod 2. A hoe including a handle shank, a rod carried thereon and provided with a lug, a set screw extending through the free end portion of said rod, a yoke associated with the rod, a bolt extending transversely of the yoke and through a lug for pivotally connecting said yoke with said rod, a set screw extending through the bight portion of the yoke and coacting with the rod, said set screws being adjustable for adjustably tilting the yoke with respect to the rod and normally locking the yoke in an adjusted position, and a blade carried by the yoke.

3. A hoe including a handle shank, a rod carried thereby, a yoke associated with the rod, means disposed intermediate the yoke and pivotally connecting the yoke with the rod whereby said yoke may be rocked with respect to said rod, means carried by the yoke and rod respectively and being adjustable for shifting the yoke with respect to the rod, said means being adaptable for locking the yoke and rod in an adjusted position, a blade carried by the yoke, and a shank carried by the blade and connecting said blade with the yoke.

4. A hoe including a handle shank, a rod carried thereby and having a lug disposed near one end portion, a yoke carried by the rod, means extending through the yoke and lug and pivotally connecting said yoke to said rod whereby said yoke may be rocked with respect to said rod, adjusting means carried in the end portion of the rod and cooperating with the yoke, and adjusting means carried by the yoke at one end portion and adapted to cooperate with the intermediate portion of the rod, said first and second means cooperating to lock the yoke and rod in an adjusted position with respect to each other.

In testimony whereof I affix my signature.

HIRAM P. SCHLAG [L. S.]